US010576921B2

(12) United States Patent
Hiermaier et al.

(10) Patent No.: US 10,576,921 B2
(45) Date of Patent: Mar. 3, 2020

(54) PEDESTRIAN PROTECTION DEVICE FOR A MOTOR VEHICLE

(71) Applicant: Bayerische Motoren Werke Aktiengesellschaft, Munich (DE)

(72) Inventors: Stefan Hiermaier, Freiburg (DE); Oeztzan Akif, Munich (DE); Gerhard Fichtinger, Grasbrunn (DE); Wilhelm Riedl, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/000,976

(22) Filed: Jun. 6, 2018

(65) Prior Publication Data
US 2018/0281712 A1    Oct. 4, 2018

Related U.S. Application Data (63) Continuation of application No. PCT/EP2016/078504, filed on Nov. 23, 2016.

(30) Foreign Application Priority Data

Dec. 7, 2015    (DE) .................. 10 2015 224 456

(51) Int. Cl.
*B60R 19/18*    (2006.01)
*B60R 19/28*    (2006.01)
(Continued)

(52) U.S. Cl.
CPC .............. *B60R 19/18* (2013.01); *B60R 19/28* (2013.01); *B60R 21/34* (2013.01);
(Continued)

(58) Field of Classification Search
CPC ... B60R 19/18; B60R 19/26; B60R 2019/262; B60R 19/34; B60R 19/36; B60R 19/38; B60R 2019/007; B60R 21/34; B60R 19/28
(Continued)

(56) References Cited

U.S. PATENT DOCUMENTS 5,460,421 A * 10/1995 Culbertson ............. B60R 19/36
188/377
6,302,458 B1 * 10/2001 Wang ...................... B60R 19/40
293/119
(Continued)

FOREIGN PATENT DOCUMENTS

DE    10 2004 059 545 A1    6/2006
DE         603 16 232 T2    6/2008
(Continued)

OTHER PUBLICATIONS

International Search Report (PCT/ISA/210) issued in PCT Application No. PCT/EP2016/078504 dated Jan. 30, 2017 with English translation (six (6) pages).
(Continued)

*Primary Examiner* — Jason S Morrow
(74) *Attorney, Agent, or Firm* — Crowell & Moring LLP (57) ABSTRACT

A pedestrian protection device for a motor vehicle includes a bumper crossmember and a deformation element which is arranged on the bumper crossmember and which has a first element and a second element which are displaceable relative to each other in the event of a collision of the motor vehicle, and a mechanical locking mechanism. The locking mechanism has a movable locking element which is pretensionable or is pretensioned with a spring device and which is arranged on the first element or on the second element, and with a depression or step to which the other of the first element and the second element can be latched in a form-
(Continued)

fitting manner. In the event of a high displacement speed which is greater than or equal to a predetermined second displacement speed, the locking mechanism prevents displacement of the first element relative to the second element by means of self-locking of the locking element. In the event of an average displacement speed which is lower than the predetermined second displacement speed and greater than a predetermined first displacement speed, the locking mechanism permits displacement of the first element and of the second element relative to each other.

12 Claims, 3 Drawing Sheets

(51) Int. Cl.
*B60R 21/34* (2011.01)
*B60R 19/00* (2006.01)
*B60R 19/26* (2006.01)

(52) U.S. Cl.
CPC ... *B60R 2019/007* (2013.01); *B60R 2019/186* (2013.01); *B60R 2019/262* (2013.01); *B60R 2019/268* (2013.01)

(58) Field of Classification Search
USPC .................. 296/187.04, 197.09; 293/133
See application file for complete search history.

(56) References Cited

U.S. PATENT DOCUMENTS

| | | | |
|---|---|---|---|
| 8,246,091 B1* | 8/2012 | Jayasuriya | B60R 19/36 180/274 |
| 8,267,445 B1 | 9/2012 | Jayasuriya et al. | |
| 2004/0222667 A1 | 11/2004 | Ericsson | |
| 2008/0309101 A1* | 12/2008 | Matsubara | B60R 19/26 293/119 |
| 2009/0096224 A1* | 4/2009 | Matsubara | B60R 19/36 293/117 |
| 2009/0295176 A1* | 12/2009 | Matsubara | B60R 19/40 293/132 |
| 2016/0068125 A1 | 3/2016 | Wendel et al. | |
| 2017/0282823 A1* | 10/2017 | Akif | B60R 19/18 |
| 2018/0118155 A1* | 5/2018 | Grehl | B60R 19/18 |

FOREIGN PATENT DOCUMENTS

| | | |
|---|---|---|
| DE | 10 2010 054 641 A1 | 6/2012 |
| DE | 10 2013 201 590 A1 | 8/2013 |
| DE | 10 2012 112 636 A1 | 7/2014 |
| DE | 10 2013 007 594 A1 | 11/2014 |
| EP | 2 014 517 A2 | 1/2009 |
| WO | WO 93/00232 A1 | 1/1993 |
| WO | WO 2016/096515 A1 | 6/2016 |

OTHER PUBLICATIONS

German-language Written Opinion (PCT/ISA/237) issued in PCT Application No. PCT/EP2016/078504 dated Jan. 30, 2017 (six (6) pages).

German-language Search Report issued in counterpart German Application No. 102015224456.3 dated Sep. 14, 2016 with partial English translation (thirteen (13) pages).

* cited by examiner

PEDESTRIAN PROTECTION DEVICE FOR A MOTOR VEHICLE

CROSS REFERENCE TO RELATED APPLICATIONS

This application is a continuation of PCT International Application No. PCT/EP2016/078504, filed Nov. 23, 2016, which claims priority under 35 U.S.C. § 119 from German Patent Application No. 10 2015 224 456.3, filed Dec. 7, 2015, the entire disclosures of which are herein expressly incorporated by reference.

BACKGROUND AND SUMMARY OF THE INVENTION

The present invention relates to a pedestrian protection device for a motor vehicle, including a bumper crossmember on which a deformation element is arranged.

A known front end of a motor vehicle has, for example, a bumper crossmember which is fastened to front ends of longitudinal members, and a bumper cladding, wherein a soft foam which is deformable at a comparatively low load level is arranged between the bumper cladding and the bumper crossmember in order to protect pedestrians. On the basis of pedestrian protection, the soft foam is arranged in order to protect a pedestrian where appropriate against direct and immediate collision with a hard stiff structure, such as, for example, the bumper crossmember.

Furthermore, it is required for the motor vehicle to remain free from damage in a collision in a very low speed range of up to, for example, 4 km/h, in which the pedestrian protection is irrelevant because of the low speed.

Furthermore, at a somewhat higher speed, which is likewise still not relevant for pedestrian protection, such as, for example, of more than 4 km/h to less than 20 km/h, it is required that damage during a collision be small as possible and, for example, a radiator structure which is located in the front end region behind the bumper crossmember is not to be damaged.

In the event of a collision at a comparatively high speed which is no longer relevant for pedestrian protection, such as, for example, a speed of more than 50 km/h, a focus is on designing the motor vehicle and the crash structure thereof for occupant protection. For this purpose, the front end or vehicle front is designed in such a manner that it can absorb a large amount of collision energy by deformation over a certain deformation distance.

These different requirements are partially in conflict with one another and, up to now, have required a comparatively long vehicle overhang and therefore a higher weight and also a disadvantageous effect on the driving dynamics.

In order to address the resulting conflicting objectives, a bumper arrangement with a crossmember which is fastened to the vehicle body via crash boxes has been proposed, for example, in DE 102010054641 A1. A pedestrian protection element for soft impact of a pedestrian is formed in front of the crossmember in the direction of travel. In addition, a pivotable energy absorption element is provided which is pivotable in front of the pedestrian protection element and thereby permits increased energy absorption in collisions in which a higher collision energy absorption capability of the crash structure of the motor vehicle is required.

DE 102012112636 A1 likewise shows a bumper arrangement, including a bumper crossmember and a pedestrian protection element which can be switched over by means of an actuator from a stiff state into a comparatively soft state which serves for pedestrian protection.

A common feature of the bumper arrangements described in DE 102010054641 A1 and of DE 102012112636 A1 is that a crash or pre-crash sensor system and an actuator are required for this purpose, wherein, on the basis of the output signals of the sensor system, a switch can be actively made between a hard stiff state of the crash structure with high collision energy absorption capability and a soft state of the crash structure with low collision energy absorption capability in favor of pedestrian protection.

Furthermore, DE60316232T2 describes an impact energy transmission arrangement for a motor vehicle, including an elongate moveable element which is arranged in front of a bumper crossmember. The moveable element is movable collision-dependently either into a state in which it is moveable with little resistance, or into a state in which a movement is blocked in a form-fitting manner. The impact energy transmission arrangement has a stop element which is pivotable about an axis and has a first stop end and a second stop end. The first stop end serves for form-fitting engagement in the case of the collision in a low speed range of a motor vehicle of below approximately 20 km/h. The second stop end serves for form-fitting engagement in the event of the collision in a high speed range of above approximately 50 km/h. The form-fitting engagement here in each case brings about a high resistance in respect of a displacement of the elongate moveable element.

It is the object of the present invention to provide a pedestrian protection device for a motor vehicle, which is constructed even more simply, functions independently of a sensor system or an actuator, keeps the damage to the motor vehicle low at a low speed, is sufficiently soft for pedestrian protection at an average speed, and improves occupant protection at a high speed.

This and other objects are achieved by a pedestrian protection device for a motor vehicle in accordance with the embodiments of the invention.

The pedestrian protection device according to the invention for a motor vehicle, for example for a front or rear end of a motor vehicle, comprising a bumper crossmember has a deformation element which is arranged on the bumper crossmember and which has a first element and a second element which, in the event of a collision of the motor vehicle, are displaceable relative to each other, in particular in the direction of the bumper crossmember, and a mechanical locking mechanism. The locking mechanism has a moveable locking element which is pretensionable or pretensioned with a spring device which is arranged on the first element or the second element and is latchable in a form-fitting manner with a depression or step to the other of the first element and the second element. At a high displacement speed which is greater than or equal to a predetermined second displacement speed, the locking mechanism prevents a displacement of the first element relative to the second element by self-locking of the locking element. Furthermore, at an average displacement speed which is lower than the predetermined second displacement speed and greater than a predetermined first displacement speed, the locking mechanism permits a displacement of the first element and of the second element relative to each other. Furthermore, at a low displacement speed which is lower than or equal to the predetermined first displacement speed, the locking mechanism permits a displacement of the first element and of the second element relative to each other at least partially by the form-fitting latching of the locking element with the depression or step.

This means that a collision sensor system and an actuator system are not necessary for controlling locking of the locking mechanism. With just one locking element, using the mass inertia of the locking element, a damping force acting on the locking element, a friction force acting on the locking element and/or a contact force acting on the locking element, the deformation element can be switched in a simple way between a soft state, in which a relative displacement is permitted between the first element and the second element, and a stiff state, in which a relative displacement between the first element and the second element is prevented, depending on the displacement speed which arises through the collision or depending on the impulse associated therewith.

A relative displacement between the first element and the second element substantially takes place here in the longitudinal direction of the motor vehicle, which is customarily also a main direction during a head-on collision of the motor vehicle.

The locking mechanism according to the present invention automatically acts independently of a collision sensor system by, for example, using the mass inertia of the locking element. Furthermore, the locking mechanism acts independently of an actuator system. In other words, the locking mechanism is not driven by an actuator which permits or prevents a displaceability of the first element relative to the second element.

According to the invention, at the low displacement speed and therefore a low collision speed, the structure of the front end or of the rear end of the motor vehicle is of sufficiently stiff design that no structural damage, for example of the bumper cladding or the like, takes place due to excessive deformation. By this means, in the event of collisions at very low speed, such as, for example, in the case of what are referred to as parking dings or prangs, repair costs can be minimized and can be limited merely to repairing, for example, paint damage.

At the average displacement speed, and therefore at an average collision speed, in which pedestrian protection is relevant, the locking mechanism is unlocked and the length of the deformation element can be changed with a relatively low force in order to protect pedestrians, i.e. can be pushed together by relative displacement of the first element and of the second element with respect to each other.

At the high displacement speed, and therefore a high collision speed, at which occupant protection is relevant, the locking mechanism is impeded and the length of the deformation element can be changed only by plastic deformation or brittle failure, and therefore collision energy can be sufficiently absorbed by the deformation element. Self-locking takes place by means of a contact force between the locking element and the first element or the second element, wherein the contact force brings about tilting of the locking element.

The locking element and the spring device are advantageously designed in an interacting manner such that, with a displacement of the first element and of the second element relative to each other, the locking element is pretensionable by the spring device.

It is thereby possible in a particularly simple manner to achieve self-locking of the locking element. The spring device presses the locking element against an outer contour of one of the first element and the second element and thereby brings about contact forces which bring about tilting of the locking element such that the latter is not moveable further and therefore the movement of the first element and of the second element with respect to each other can be impeded.

Furthermore, the spring device can be substantially relaxed in a starting position. A starting position denotes the position of the pedestrian protection device before a collision of the motor vehicle.

This has the advantage that the spring device does not lose its spring tensioning force in the normal state.

According to a development of the pedestrian protection device of the present invention, the locking mechanism has a contact surface which is arranged and designed in such a manner that, upon a movement of the first element and of the second element relative to each other, the locking element is moveable along the contact surface in contact with the contact surface counter to the spring force of the spring device and is therefore pretensionable before the locking element reaches the form fit with the depression or the step. The contact surface is therefore in front of the depression or the step in the displacement direction. The spring device, the locking element and the contact surface interact here in such a manner that, at the high displacement speed, when the locking element is in engagement with the contact surface, a movement of the locking element along the contact surface and therefore a displacement of the first element and of the second element relative to each other is prevented by the self-locking of the locking element. At the average displacement speed, when the locking element is in engagement with the contact surface, a movement of the locking element along the contact surface is permitted, and, owing to a mass inertia of the locking element, the locking element, on leaving the contact surface, springs over the depression or step, and therefore does not latch into place in a form-fitting manner, and a further displacement of the first element and of the second element with respect to each other is permitted. And, at the slow displacement speed, when the locking element is in engagement with the contact surface, a movement of the locking element along the contact surface is permitted, and the locking element latches into place in a form-fitting manner with the depression or step at the slow displacement speed.

By way of the pretensioning of the locking element over the course of the collision at the low and the average displacement speed, the collision load is advantageously used for pretensioning the spring device. This creates an automatic passive mechanism which only uses friction forces between the locking element and the contact surface, a mass inertia of the locking element and/or a damping action of the spring element for its function. Accordingly, at the low displacement speed and therefore the low collision speed, latching into place takes place and the deformation element accordingly acts in a stiff manner. At the average displacement speed and therefore the average collision speed, the locking element does not latch into place because of its mass inertia and the other influencing variables mentioned at the average displacement speed, the locking element on the contrary passes during the relative movement of the first element and of the second element with respect to each other over the depression or the step without engagement and a further displacement between the first element and the second element is permitted, as a result of which the deformation element as a whole acts in a soft manner. At the high displacement speed, a movement of the locking element is impeded by high contact forces which are in action, and therefore, in turn, substantially no displacement of the first element in relation to the second element is permitted.

The contact surface is preferably designed obliquely with respect to a displacement direction of the first element and of the second element relative to each other. The contact surface here has a slope in the displacement direction of the locking element.

By way of the oblique design of the contact surface or the slope, the locking element can be progressively pretensioned with the spring device. Furthermore, by this measure, a contact force can advantageously act on the locking element during the collision.

According to a further preferred development, the deformation element is adapted in order, in a state of the locking mechanism, in which a displacement of the first element relative to the second element has been/is at least partially prevented by self-locking or latching, to absorb collision energy by plastic deformation and/or brittle failure of the deformation element over a predetermined deformation distance, for example within a range of 60 mm to 110 mm.

Accordingly, depending on the collision load and the speed during the collision, the deformation element can react in a sufficiently stiff manner and can transmit the collision load to the vehicle crash structure located therebehind, or a load threshold value of the self-locked or locked deformation element is exceeded, and therefore the latter is deformed and can thus absorb collision energy in order to protect other components and the vehicle occupants.

Preferably, in the event of the average displacement speed, at which the locking mechanism is neither self-locked nor latched, an energy absorption of the deformation element is lower than an energy absorption of the deformation element in the event of the low and high displacement speed.

Preferably, at the average displacement speed, the first element and the second element can be moveable relative to each other over a distance of 60 to 110 mm.

At the average displacement speed, the deformation element is therefore deformed at least over the distance provided for this purpose in order to protect a pedestrian at a relatively low load level.

The first element can be a cylindrical element which is displaceable in a corresponding guide of the second element. The locking element can be mounted on the first element or on the second element. In particular, the first element can be a hollow-cylindrical element. The first element here can have a circular cross section. The first element can preferably have a polygonal, in particular generally polygonal, cross section.

According to a preferred development of the pedestrian protection device, a deformation region of the deformation element can be formed between a bumper cladding and the bumper crossmember.

The second element is preferably secured on the bumper crossmember or is an integral component of the bumper crossmember.

Furthermore, the first element can be displaceable into an opening of the bumper crossmember.

By this means, a "soft" deformation region of the deformation element can be increased.

The spring device can additionally be provided with a damping device which suitably damps a movement of the locking element. Latching into place/non-latching of the locking element is therefore controllable in a suitable manner.

According to a further advantageous development of the pedestrian protection device, a deformation region of the deformation element is arranged on an outer side of the bumper crossmember. In the case of a front bumper crossmember, the outer side is the front side of the bumper crossmember. In the case of a rear bumper crossmember, the outer side of the bumper crossmember is the rear side of the bumper crossmember. In particular, the deformation region of the deformation element is formed between a bumper cladding and the bumper crossmember.

An advantage of the arrangement of the deformation element on the outer side of the bumper crossmember is that, in particular with respect to pedestrian protection, the deformation element directly protects the pedestrian by means of the soft structure. On the other hand, the bumper crossmember would have to be correspondingly softly mounted, wherein, in addition, a mass inertia of the bumper crossmember prevents direct soft flexibility.

The locking element is preferably mounted in a linearly moveable manner, in particular exclusively in a linearly moveable manner.

Above-cited developments of the invention can be combined as desired with one another in so far as is possible and expedient.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 to 5 show a pedestrian protection device for a motor vehicle according to an exemplary embodiment of the present invention before a collision of the motor vehicle and during a collision of the motor vehicle at various speeds.

Figure 1:
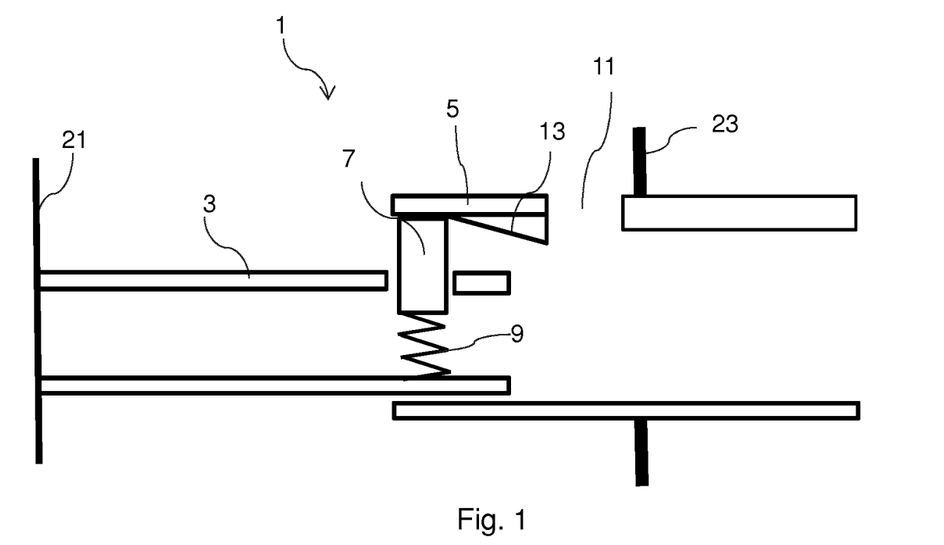
FIG. 1 schematically shows a pedestrian protection device of a motor vehicle according to an exemplary embodiment of the present invention before a collision of the motor vehicle, in a starting state of a deformation element.

The pedestrian protection device is mounted with a bumper crossmember 23 at a front end of a motor vehicle front end, in particular a motor vehicle front. In particular, the pedestrian protection device 1 is arranged in a space between a vehicle outer skin, that is to say a bumper cladding 21, and the bumper crossmember 23. As is shown in FIG. 1, the pedestrian protection device has a deformation element 1 with a first element 3 and a second element 5. The first element 3 and the second element 5 are basically designed to be displaceable or shiftable with respect to each other. In particular, the first element 3 can be pushed into the second element 5. The second element 5 is secured on the bumper crossmember 23 and is rigidly connected thereto. In addition, the deformation element 1 has a locking mechanism which can restrict a displacement of the first element 3 with respect to the second element 5. The locking mechanism has a locking element 7 which is pretensionable and displaceable in the transverse direction by way of a spring 9. In other words, the locking element 7 is mounted in/on the first element 3 so as to be shiftable transversely with respect to a longitudinal direction of the vehicle. The locking mechanism furthermore has a contact surface 13 which is formed on an inner side of the second element 5, and a recess 11 which is likewise formed in the second element 5, that is to say on the circumference thereof. The contact surface 13 is provided with a slope in the longitudinal direction of the vehicle, that is to say in the displacement direction of the first element 3 or of the locking element 7, and is therefore formed obliquely, in particular at a very acute angle, to the longitudinal direction of the vehicle.

The function of the deformation element 1 and in particular of the locking mechanism is described below with reference to FIGS. 2 to 5.

The function and action of the pedestrian protection device 1 in the event of a head-on collision of the motor vehicle at an average or low collision speed is described below.

Figure 2:
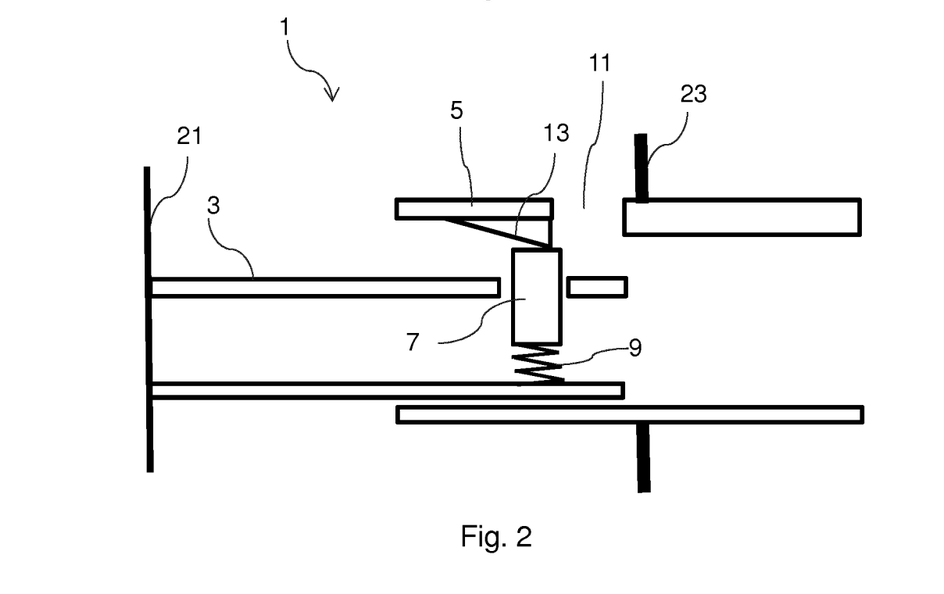
FIG. 2 schematically shows the pedestrian protection device according to the exemplary embodiment of the present invention over the course of the collision of the motor vehicle at a low speed or an average speed, with a pretensioned spring device of the deformation element.

FIG. 2 shows a state of the deformation element over the course of a head-on collision of the motor vehicle at a low or an average collision speed. A collision load acts here on the first element 3 via the bumper cladding 21, as a result of which the first element 3 is displaced in the direction of the second element 5, and therefore of the bumper crossmember 23. The locking element 7 comes into contact here with the contact surface 13 which is formed on the inner side of the second element 5.

At the average and low collision speed, which in turn brings about an average or low displacement speed of the first element 3 in relation to the second element 5, the contact forces, which are described further on with respect to the high collision speed, are lower and therefore do not lead to any self-locking in the form of a tilting. By interaction between the locking element 7 and the contact surface 13, the locking element 7 is therefore moved in the transverse direction over the course of the displacement of the first element 3 and is therefore pressed against the spring device 9 such that said spring device 9 is pretensioned (here compressed). FIG. 2 shows the state in which the locking element is displaced by a maximum distance in the transverse direction and therefore a maximum pretensioning of the spring device 9 is achieved.

Figure 3:
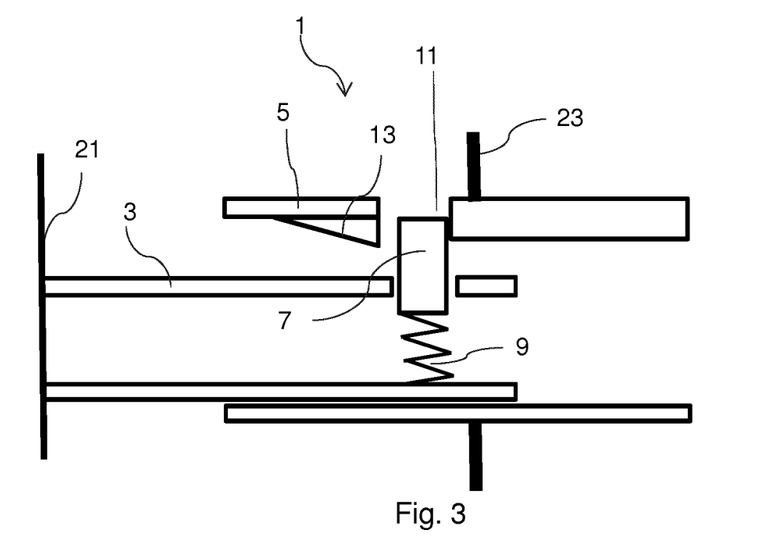
FIG. 3 schematically shows the pedestrian protection device according to the exemplary embodiment of the present invention over the course of the collision of the motor vehicle at the low speed, in a locked state of the deformation element.

FIG. 3 shows a further course of the collision at a low displacement speed of the first element 3 and therefore the low collision speed of the motor vehicle. After a maximum pretensioning of the spring device 9 or of the locking element 7 and upon leaving the contact surface 13, the locking element 7 is pressed in the transverse direction toward the outer wall of the second element 5. In the process, the locking element 7 engages with a recess or depression 11 in the wall of the second element 5. In this state, the locking element 7 is in form-fitting engagement both with the first element 3 and with the second element 5, and therefore a further displacement of the first element 3 relative to the second element 5 is blocked by the locking element 7. As soon as the state shown in FIG. 3 is reached, the deformation element 1 acts as a stiff element. In this state, the deformation element can transmit collision loads from the collision counterpart directly to the bumper crossmember 23 and the motor vehicle crash structure located therebehind. If a certain collision load is exceeded, the deformation element 1 fails due to plastic deformation or brittle failure and therefore absorbs collision energy over a predetermined failure distance of at maximum the length of the deformation element 1 in the locked state.

The deformation element 1 is designed in particular in such a manner that it can transmit a collision load at collision speeds of, for example, less than 4 km/h to the crash structure without deformation.

At a greater collision speed which, however, is not yet relevant for pedestrian protection, such as, for example, a speed of between 4 km/h and 20 km/h, the deformation element 1 is deformed at a certain load level, and therefore the deformation element 1 contributes to dissipating collision energy without, for example, structural elements present behind the bumper crossmember 23, such as, for example, a radiator, being damaged.

Figure 4:
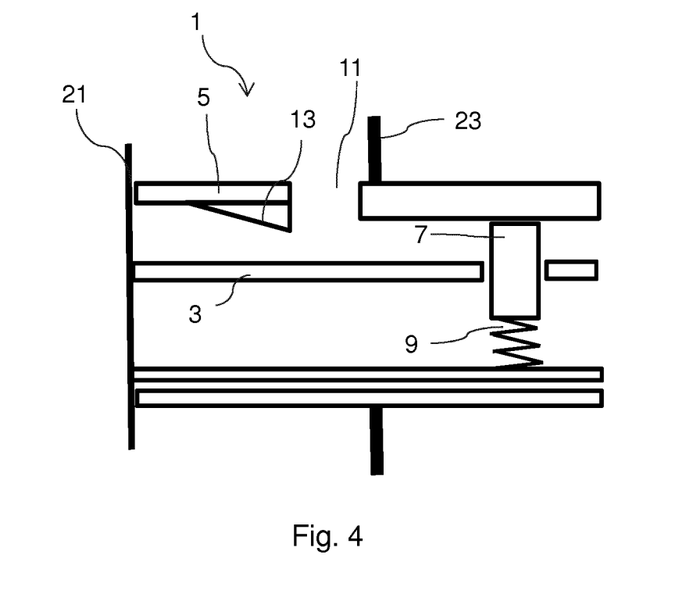
FIG. 4 schematically shows the pedestrian protection device according to the exemplary embodiment of the present invention over the course of the collision of the motor vehicle at the average speed, in an unlocked state of the deformation element.

FIG. 4 shows a further course of the collision in the event of an average displacement speed of the first element 3 and therefore the average collision speed of the motor vehicle. In the state shown in FIG. 4, no form-fitting engagement of the locking element 7 and therefore of the first element 3 with the second element 5 takes place and, accordingly, the first element 3 has been displaced further in the direction of the bumper crossmember 23 relative to the second element 5 with relatively little resistance. The locking element 7 has "jumped" over the recess 11. For example, the deformation element 1 can be designed in such a manner that, from a collision speed of approximately 20 km/h, no latching takes place between the first element 3 and the second element 5, and the deformation element 1 therefore as a whole reacts significantly more softly over a longer deformation distance than is the case at the low collision speed in the locked state or state latched into place, shown in FIG. 3. Similarly, at the average collision speed, the deformation element 1 reacts more softly than in the case of the high collision speed described further on with respect to FIG. 5.

Owing to a mass inertia of the locking element 7, the locking element 7 requires a certain time until it is moved sufficiently far in the transverse direction by means of the spring device 9. At the average displacement speed of the first element 3, this leads to the fact that the locking element 7 cannot engage in the recess 11 of the second element 5, and therefore the first element 3 can be displaced further in the direction of the bumper crossmember 23 and the locking element 7 comes into contact with an inner side of the second element 5 and can be displaced along the inner side. No form-fitting engagement between the locking element 7 and the second element 5 occurs.

At the average collision speed of, for example, more than 20 km/h and less than 50 km/h, it is important for the front end of the motor vehicle front end, and in particular the bumper cladding, to react sufficiently softly in conjunction with the deformation element 1 at a low deformation force level.

This is realized according to the invention by the described locking mechanism which functions on the basis of a mass inertia of the locking element 7 in conjunction with the spring force of the spring element 9 and friction forces.

This makes it possible to solve the conflicting objectives which firstly requires sufficiently great rigidity of the deformation element 1 or a sufficiently great deformation force level of the deformation element 1 at the low collision speed, ensures sufficient pedestrian protection by a low deformation force level at the average collision speed, and, at the high collision speed, in turn requires a sufficiently large deformation force level of the deformation element 1.

Figure 5:
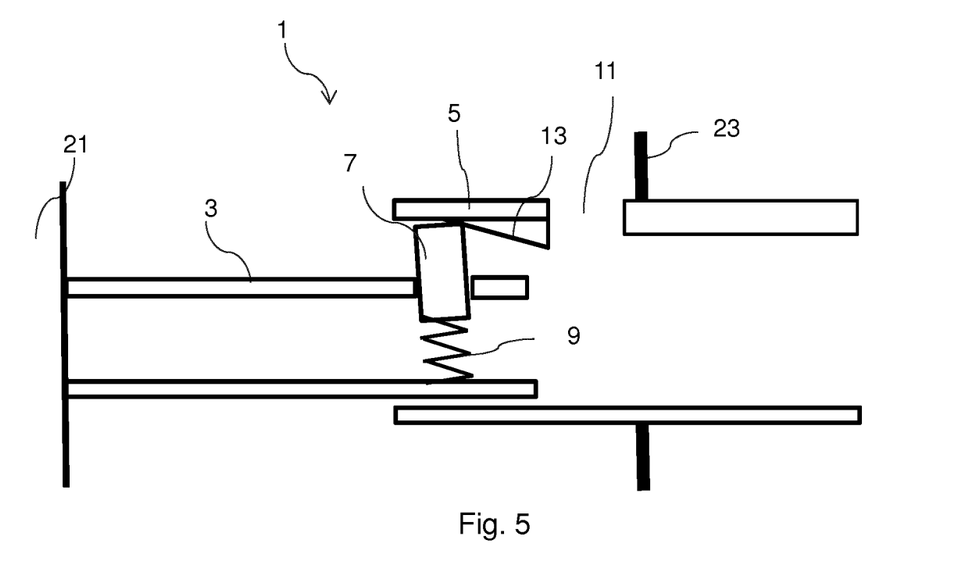
FIG. 5 schematically shows the pedestrian protection device according to the exemplary embodiment of the present invention over the course of the collision of the motor vehicle at the high speed, in a self-locked state of the deformation element.

FIG. 5 shows a profile of the collision at a high displacement speed of the first element 3 and therefore the high collision speed of the motor vehicle.

If the head-on collision of the motor vehicle takes place at the high collision speed, in particular a high relative speed between the motor vehicle and a collision counterpart, the first element 3 is displaced at a high displacement speed in relation to the second element 5. In this case of the high displacement speed, the locking element 7 initially comes into contact with the contact surface 13, as in the case of the collision at the low and the average speed, or is already in contact with the contact surface 13 in the starting position. At the high displacement speed, high contact forces act at the contact position between the locking element 7 and the contact surface 13 and also between the locking element 7 and the first element 3, i.e. in the region of a mounting of the locking element 7 on the first element 3. By means of the high contact forces, the locking element 7 is impeded or blocked and moves little, if at all, in the transverse direction. The locking element 7 is tilted in the region of the mounting. Overall, self-locking of the locking mechanism with the locking element 7 accordingly takes place at the high collision speed.

Accordingly, at the high collision speed, the locking mechanism blocks a movement or displacement of the first element 3 in relation to the second element 5, and therefore compression of the deformation element 1 is possible only via plastic and/or brittle failure of the deformation element 1. The deformation element 1 is therefore substantially deformable over its entire original length at a high force level by means of the plastic and/or brittle failure, and therefore a relatively large amount of collision energy can be dissipated over substantially the entire length of the deformation element 1. The front end of the motor vehicle front end, and in particular the bumper cladding 23 in conjunction with the deformation element 1, therefore has sufficient strength, wherein said deformation element fails at a high deformation force level.

The high collision speed at which the displacement of the first element 3 in relation to the second element 5 is impeded can be, for example, 50 km/h or more. From the speed of, for example, 50 km/h, pedestrian protection is less of a consideration than occupant protection. For the occupant protection, it is in turn advantageous if as much collision energy as possible can be dissipated over the available deformation length, which is therefore ensured by the pedestrian protection device according to the invention. In addition to the remaining crash structure of the front end, the region between the bumper cladding 21 and the bumper crossmember 23 is therefore also available for adequately dissipating collision energy.

The locking element 7 can be mounted movably on the second element and can correspondingly engage with the first element.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pedestrian protection device for a motor vehicle, comprising:
   a bumper crossmember;
   a deformation element, which is arrangeable on the bumper crossmember and which has a first element and a second element which, in an event of a collision of the motor vehicle, are displaceable relative to each other; and
   a mechanical locking mechanism which has a moveable locking element that interacts with a contact surface and which is pretensionable or is pretensioned with a spring device, the movable locking element being arranged on the first element or the second element and being latchable in a form fitting manner with a depression or step to the other of the first element and the second element, wherein
   at a high displacement speed which is greater than or equal to a predetermined second displacement speed, the locking mechanism prevents a displacement of the first element relative to the second element by self locking of the locking element,
   at an average displacement speed which is less than the predetermined second displacement speed and greater than a predetermined first displacement speed, the locking mechanism permits a displacement of the first element and the second element relative to each other, and
   at a low displacement speed which is less than or equal to the predetermined first displacement speed, the locking mechanism prevents a displacement of the first element and the second element relative to each other at least partially by a form-fitting latching of the locking element with the depression or step.

2. The pedestrian protection device as claimed in claim 1, wherein
   the locking element and the spring device are configured to interact such that, with a displacement of the first element and the second element relative to each other, the locking element is pretensionable by the spring device, and
   the spring device is substantially relaxed in a starting position.

3. The pedestrian protection device as claimed in claim 2, wherein
   the contact surface is arranged and configured such that, upon a relative movement of the first element and the second element with respect to each other, the locking element is moveable along the contact surface in contact with the contact surface counter to the spring force of the spring device and is therefore pretensionable before the locking element reaches the form fit with the depression or the step, and
   the spring device, the locking element and the contact surface interact in such a manner that:
      at the high displacement speed, when the locking element is in engagement with the contact surface, a movement of the locking element along the contact surface and therefore a displacement of the first element and the second element relative to each other is prevented by the self locking of the locking element,
      at the average displacement speed, when the locking element is in engagement with the contact surface, a movement of the locking element along the contact surface is permitted, and, owing to a mass inertia of the locking element, the locking element, on leaving the contact surface, springs over the depression or step, and therefore does not latch into place in a form fitting manner, and a further displacement of the first element and the second element with respect to each other is permitted, and wherein, at the slow displacement speed, when the locking element is in engagement with the contact surface, a movement of the locking element along the contact surface is permitted, and the locking element latches into place in a form fitting manner with the depression or step at the slow displacement speed.

4. The pedestrian protection device as claimed in claim 3, wherein the contact surface is formed obliquely with respect to a displacement direction of the first element and the second element relative to each other, and has a slope in the direction of the contact surface in the displacement direction of the locking element.

5. The pedestrian protection device as claimed in claim 1, wherein the deformation element is adapted in order, in a state of the locking mechanism, in which a displacement of the first element relative to the second element has been/is at least partially prevented by self locking or latching, to absorb collision energy by plastic deformation and/or brittle failure of the deformation element over a predetermined deformation distance.

6. The pedestrian protection device as claimed in claim 5, wherein the predetermined deformation distance is within a range of 60 mm to 110 mm.

7. The pedestrian protection device as claimed in claim 5, wherein in the event of the average displacement speed, at which the locking mechanism is neither self locked nor latched, an energy absorption of the deformation element is lower than an energy absorption of the deformation element in the event of the low and high displacement speed.

8. The pedestrian protection device as claimed in claim 1, wherein at the average displacement speed, the first element and the second element are moveable relative to each other over a distance of 60 to 110 mm.

9. The pedestrian protection device as claimed in claim 1, wherein the first element is a cylindrical element which is displaceable in a corresponding guide of the second element, and the locking element is mounted moveably on the first element or the second element.

10. The pedestrian protection device as claimed in claim 1, wherein a deformation region of the deformation element is formed between a bumper cladding and the bumper crossmember.

11. The pedestrian protection device as claimed in claim 1, wherein the second element is secured on the bumper crossmember or is an integral component of the bumper crossmember.

12. The pedestrian protection device as claimed in claim 10, wherein the first element is displaceable into an opening of the bumper crossmember.

* * * * *